Figure 1:
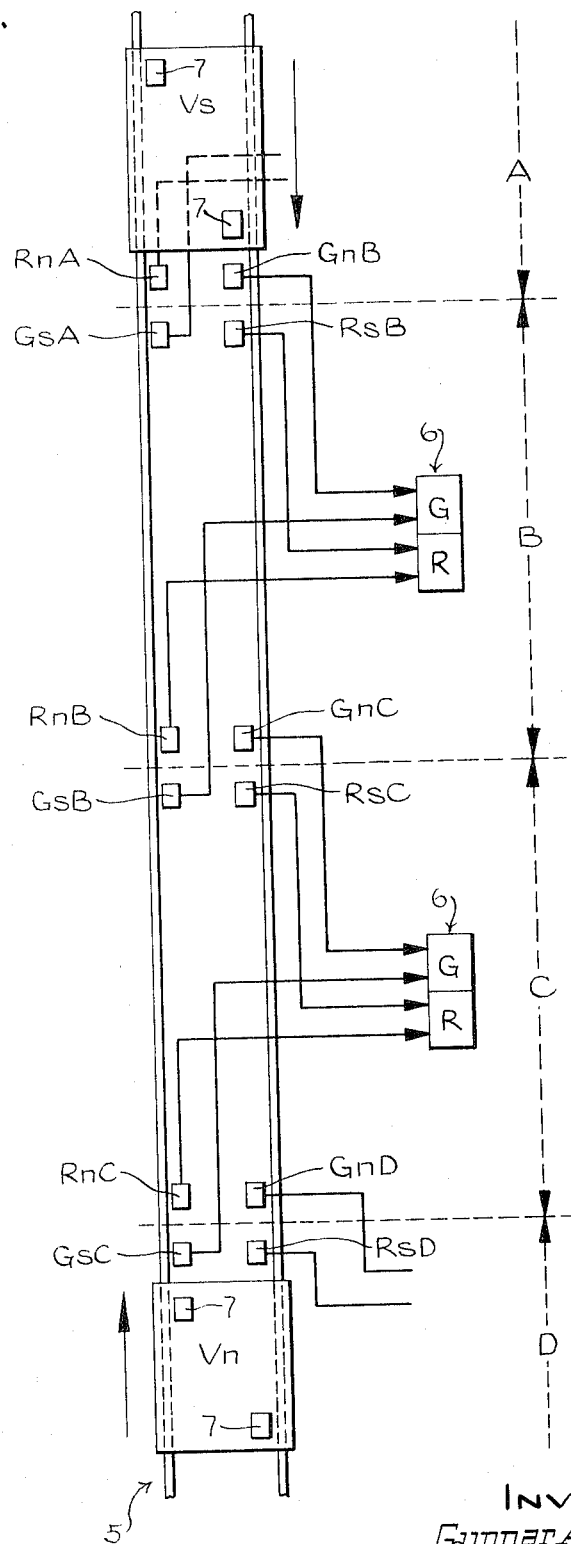

United States Patent
Wallgard

[15] 3,638,014
[45] Jan. 25, 1972

[54] VEHICLE TRACK BLOCK SIGNAL APPARATUS

[72] Inventor: Gunnar Alexius Wallgard, Huskvarna, Sweden

[73] Assignee: SAAB Aktiebolag, Linkoping, Sweden

[22] Filed: Sept. 22, 1969

[21] Appl. No.: 859,970

[30] Foreign Application Priority Data

Sept. 27, 1968 Sweden.................................13129/68

[52] U.S. Cl.............................................................246/91
[51] Int. Cl...........................................................B61l 13/00
[58] Field of Search.....................246/28, 33, 77, 87, 91, 90

[56] References Cited

UNITED STATES PATENTS

| | | | |
|---|---|---|---|
| 2,994,764 | 8/1961 | Witmer et al. | 246/28 R |
| 560,193 | 5/1896 | Creelman | 246/91 |
| 926,022 | 6/1909 | Samuels | 246/91 |

Primary Examiner—Arthur L. La Point
Assistant Examiner—George H. Libman
Attorney—Ira Milton Jones

[57] ABSTRACT

The condition of a signal for each block of vehicle track corresponds to that of a bistable memory unit placed in one condition by momentary output of an arrival detector and in its other condition by momentary output of a departure detector. All detectors are actuated by a single type of vehicle-carried exciter. An arrival detector is located near each end of each block. A departure detector is spaced along the track from each arrival detector, in the direction away from the other arrival detector.

4 Claims, 2 Drawing Figures

VEHICLE TRACK BLOCK SIGNAL APPARATUS

This invention relates generally to signal systems for indicating whether or not a lengthwise extending block of track is occupied by a vehicle, and the invention is concerned more specifically with block signal apparatus of the type comprising wayside vehicle detector means located along a track and by which a momentary output is produced in response to the passage of a vehicle that carries an exciter for the detector means.

In railroad and similar systems having a single track along which vehicles operate in both directions, the track is divided along its length into defined sections or blocks, and signals appropriately located with respect to each block indicate whether or not the block is occupied by a vehicle. In any such system the signal means for each block can give a proper indication of condition of the block only if a vehicle is detected as it enters the block and again as it leaves the block; and each detection must result in the signal being converted to its appropriate condition.

In automatic signal systems, detection of entry of a vehicle into a block and of its departure therefrom are accomplished by means of detectors located adjacent to the track, near opposite ends of each block, that are responsive to exciter means carried by all vehicles using the track. The detector produces a momentary output as an exciter-carrying vehicle passes it. Such detectors are not sensitive to the direction of motion of a vehicle carrying an exciter, and therefore a particular detector can produce its output both when an exciter-carrying vehicle enters its block going in one direction and when such a vehicle leaves its block going in the opposite direction.

Because of the ambiguity of the output signal from a particular detector, it has heretofore been proposed to provide one kind of exciter at the front of each vehicle and another kind of exciter at its rear, and to provide two types of detectors, each responsive to only one of the exciters. In one system, an arrival exciter was placed at one side of the vehicle, near the front thereof, to cooperate with an arrival detector at the corresponding side of the track near the entry to each block, and a departure exciter was mounted near the rear of the vehicle, at the other side thereof, to cooperate with a departure detector at the corresponding side of the track near the exit from each block. Thus at each end of a block there was an arrival detector at one side of the track and a departure detector at the other side of the track, the arrival detectors at opposite ends of the block being at opposite sides of the track. With that system, proper signal indications were obtained only if the vehicle was bodily turned around at each end of the line so that its arrival exciter was always at its front relative to its direction of motion.

With the prior apparatus just described, it was necessary to exercise care in making replacements of both exciters and detectors, to be sure that a unit of the proper character was installed. Furthermore, since arrival exciters and departure exciters usually differed with respect to the frequency of an emitted signal, each exciter was in itself a relatively complicated and expensive device; and the detectors, which had to be tuned to the exciters, were likewise complicated and expensive.

By contrast, it is a general object of the present invention to provide block signal apparatus of the character described having arrival detectors and departure detectors which are all responsive to the same character of excitation, to thus avoid any possibility of confusion in making exciter replacements, and, more important, to permit so-called pendulum operation of vehicles whereby each vehicle need only reverse its direction of motion at each end of the track without being physically turned around.

Another object of this invention is to provide block signal apparatus of the character described that incorporates very simple and inexpensive exciters and detectors.

It is also an object of this invention to provide a block signal system that fails safe, that is, gives a block-occupied (red) signal in the event of power failure in the signal system or a failure of any of its components, thus preventing any possibility of two vehicles occupying the same block of track.

With these observations and objectives in mind, the manner in which the invention achieves its purpose will be appreciated from the following description and the accompanying drawings, which exemplify the invention.

Figure 2:
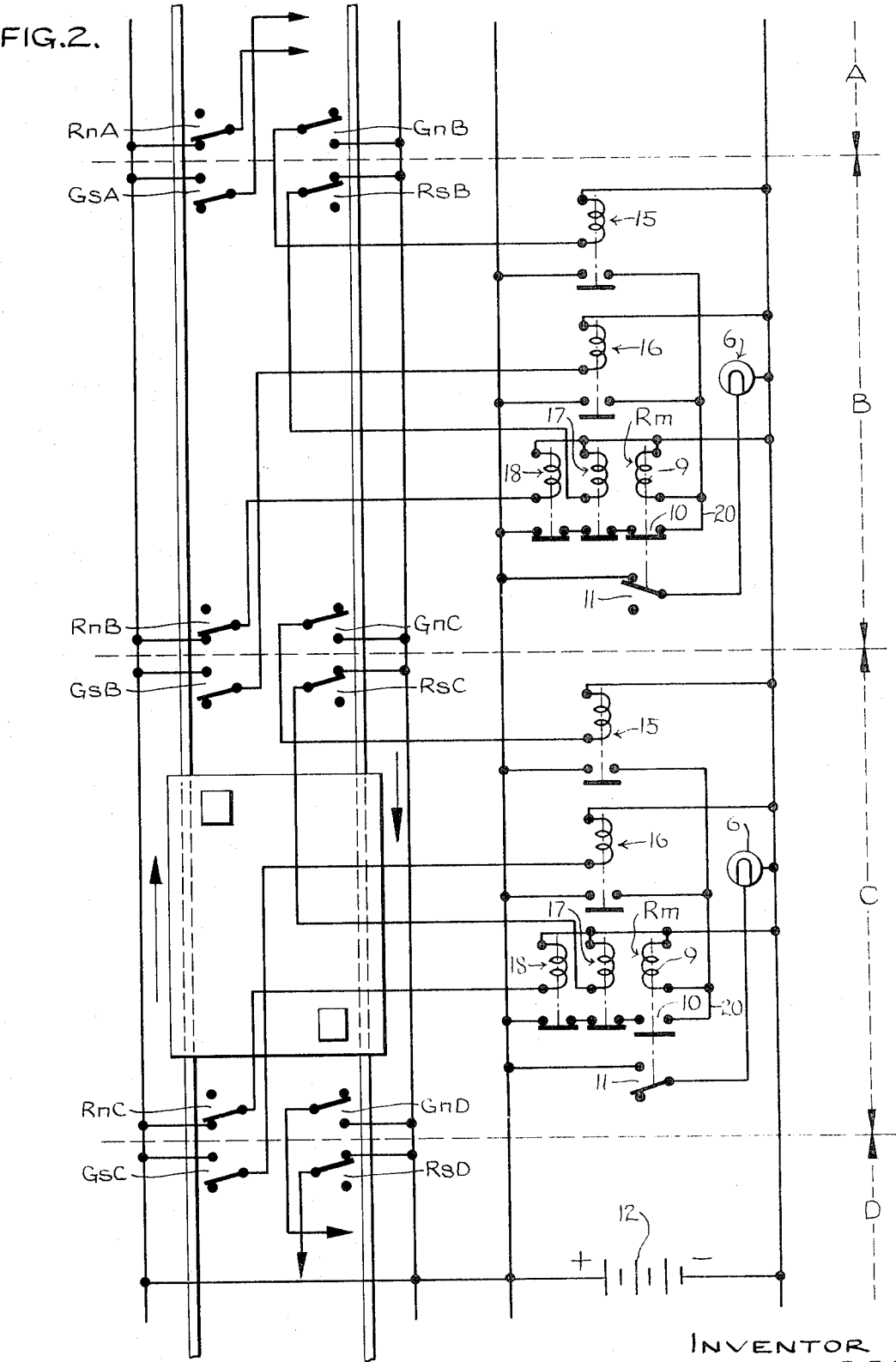

The accompanying drawings illustrate one complete example of an embodiment of the invention constructed according to the best mode so far devised for the practical application of the principles thereof, and in which:

FIG. 1 is a more or less diagrammatic illustration of a stretch of track comprising several blocks and along which vehicles can operate in opposite directions, each block being provided with signal apparatus embodying the principles of this invention; and FIG. 2 is a circuit diagram of the FIG. 1 apparatus.

Referring now to the accompanying drawings, the numeral 5 designates generally a stretch of track along which vehicles Vs and V$n$ can operate in opposite directions. Along its length the track 5 is divided into blocks, designated A, B, C, D, each having its own signal means 6 that indicates the condition of the block.

For purposes of illustration it will be assumed that each signal means 6 displays a green condition when its block is unoccupied and displays a red condition whenever its block is occupied by a vehicle. For simplicity, FIG. 2 illustrates the signal means 6 as comprising a light that is lit in the green condition and is unlighted in the red condition. For purposes of explanation it will be further assumed that the tracks 5 are oriented north-and-south, mapwise, and that vehicle V$n$ is northbound and vehicle Vs is southbound.

Each of the vehicles V$n$ and Vs carries exciter means 7. Preferably the exciter means comprises an exciter near the front of the vehicle, at one side thereof (the left side as shown) and an identical one near the rear of the vehicle at its other (right) side. Note that the exciters, when so located, are always at the right-front and left-rear, regardless of the direction of vehicle travel and regardless of whether the vehicle is turned around at the end of the line or operated pendulum-fashion. Preferably each exciter 7 comprises a magnet, and the exciters are thus simple, inexpensive and interchangeable.

The exciters cooperate with arrival and departure detectors that are mounted along the tracks at locations near the end of each block. Each detector can be in the nature of a magnetically actuated switch, such as a reed switch, which produces a momentary signal in response to passage of a magnet in proximity to it.

In the drawings, the detectors are designated according to their functions, that is, each arrival detector, is designated by a reference character beginning with R, to denote that it causes its associated signal means 6 to go to a red condition, and each departure detector has a designation prefixed by G. The suffix in the reference character for each detector denotes the block controlled by the signal means with which it is connected. The $s$ or $n$ in each reference character denotes whether the detector is intended to be functionally actuated by a southbound or a northbound vehicle. Thus R$n$C is an arrival detector connected with the signal for block C and which places that signal in red condition when a northbound vehicle passes it, and G$s$B is a departure detector connected with the signal for block B and which places that signal in green condition when a southbound vehicle passes it.

Preferably the arrival detectors (R$n$A, R$s$B, R$n$B etc.) are normally closed switch elements, momentarily opened by transit of an exciter, while the departure detectors (G$s$A, G$n$B, etc.) are normally open switch elements.

It is important that the several detectors for each block be properly arranged. There must be an arrival detector near each end of each block, and there must also be a departure detector near each arrival detector, but each departure detector must be spaced along the track from its adjacent arrival detector for the same block, in the direction away from the other arrival detector for that block. Thus, with respect to block B, there is one arrival detector R$s$B near the north end of the block and another R$n$B near the south end. One departure detector G$n$B for block B is near the north arrival detector R$s$B but is spaced to the north of it, while the departure detector G$s$B for the south end of block B is spaced to the south of arrival detector R$n$B.

Preferably each arrival detector is just within the limits of the block for the signal with which it is connected, while each departure detector is just inside the next adjacent block. Also note that the arrival detector for each direction of travel is at the left side of the track for that direction of travel, to be actuated by the front exciter on the vehicle as it enters the block. (Compare the relationship of the front exciter 7 on V$n$ with the position of R$n$C, and likewise that of the front exciter on V$s$ with the position of R$s$B.) Similarly, note that the departure detector for each travel direction is located at the right side of the track, to be actuated by the right exciter, so that the green condition will not be signalled for a block until a vehicle is definitely out of that block. (Compare the relationship of the rear exciter 7 on V$n$ with the position of G$n$D, and likewise that of the rear exciter on V$s$ with the position of G$s$A.)

It will be obvious at this point that the left and right relationship of exciters and detectors need not be maintained. For example there could be a single exciter on the vehicle, and laterally adjacent detectors could be located so close together as to be actuated simultaneously by it, or could even comprise different contacts on one and the same unit. But in any such alternative arrangement the above-described spacing along the track of the respective arrival and departure detectors for each block must of course be maintained. The illustrated arrangement is preferred because of the fail-safe feature that it provides, as described hereinafter, and because it affords precise timing of signal condition changes as a vehicle moves from block to block.

At this point it will be evident that as a vehicle moves through the end of a block, it effects certain nonfunctional actuations of the detectors connected with the signal for the blocks that it is leaving and entering. However, these actuations do not interfere with the desired operation of the system. By way of example, consider the northbound vehicle V$n$, which is illustrated as being in block D. The signal for block D is therefore red. The signal for block C, which is unoccupied, is green. As vehicle V$n$ is moving through the north end of block D, it actuates departure detector G$s$C, which produces an output intended to place the signal for block C in green condition, but since that signal is already green, that output is of no significance. Similarly, just as V$n$ is leaving block D it actuates R$s$D, which is intended to place the signal for block D in red condition, but since that signal is already red, the momentary output from detector R$s$D has no effect upon the signal system.

By reference to the circuit diagram, FIG. 2, it can be seen how the apparatus functions to control signal condition.

The condition of each signal 6 is determined by the condition of a bistable memory unit for its block, illustrated as comprising a relay R$m$ that has an actuator winding 9, a set of self-holding contacts 10, and a control element 11 that is connected with the signal. Current for the control apparatus and for the signals 6 is supplied from a suitable source, illustrated as a battery 12. To insure that the apparatus will fail-safe (go to red in the event of current failure or failure of a component), the control element 11 is so arranged that the signal light is energized (green) only when the winding 9 of the memory unit relay R$m$ is energized.

Energization of the memory relay winding 9 is controlled by a first relay means 15, 16, through which it can be momentarily energized to effect closure of the self-holding contacts 10, and by second relay means 17, 18 controlling a self-holding circuit that comprises the contacts 10, whereby the memory relay remains energized until the self-holding circuit is broken in consequence of momentary actuation of the second relay means.

The first relay means comprises a relay 15 that has its winding connected in an energizing circuit controlled by one departure detector for its block (e.g., G$n$B, G$n$C) and a relay 16 that has its winding connected in an energizing circuit controlled by the other departure detector for its block (G$s$B, G$s$C). Since the departure detectors have normally open contacts, the windings of the first relay means 15 and 16 are normally unenergized and their contactors are normally open.

The contactors of the first relay means are connected in parallel circuits through either of which the winding 9 of the memory unit relay can be energized; hence momentary energization of the winding of either relay 15 or relay 16, in consequence of actuation of a departure detector, closes the contactor of the energized relay and thus energizes the winding 9 of the memory unit relay.

When the winding 9 of the memory unit relay is thus momentarily energized, closure of its contacts 10 completes a self-holding circuit that can be traced, in series, through the contacts of the second relay means 17 and 18, the self-holding contacts 10, and a conductor 20 that connects the contacts 10 with the winding 9.

Energization of the second relay means is controlled by the arrival detectors. Thus the energizing circuit for the relay 17 comprises one arrival detector for its block (R$s$B, R$s$C, etc.), and the energizing circuit for the relay 18 comprises the other arrival detector for its block (R$n$B, R$n$C, etc.).

Since the arrival detectors comprise normally closed contacts, the second relay means remain normally energized until one of the arrival detectors is actuated. Hence the output signal from each arrival detector is a momentary interruption of energizing current to its associated relay 17 or 18.

Once the memory relay winding has been energized by a departure detector pulse, completing the self-holding circuit through the contacts 10, the memory unit remains in its signal green condition until either of the relays 17 or 18 is opened by an arrival detector output, whereupon the momentary deenergization of that relay breaks the self-holding circuit and causes the memory unit relay to assume its signal red condition.

Note that when the memory relay is energized (signal green condition) its condition is not altered by energization of one of the relays 15 or 16 by a departure detector output. Similarly, its unenergized (signal red) condition is not altered by a nonfunctional actuation of an arrival detector.

It will be obvious that with certain self-evident changes in the relay means, the detectors could all be of one type, either all normally closed or all normally open, for complete interchangeability. Thus, if the arrival detectors were of the normally open type, the relays 17 and 18 of the second relay means would have to be of the normally closed type, so that they would break the self-holding circuit in response to an energizing pulse from an arrival detector instead of in response to an energization interruption. Such alternative arrangements, however, might not have the advantage of failing safe.

From the foregoing description taken with the accompanying drawings it will be apparent that this invention provides block signal apparatus of the type comprising detectors fixed along a block of track and actuated by a vehicle-mounted exciter, wherein the exciter can be a simple magnet and the detectors can be correspondingly simple magnetically actuated switch devices.

Those skilled in the art will appreciate that the invention can be embodied in forms other than as herein disclosed for purposes of illustration.

The invention is defined by the following claims:

1. Means for automatically causing a signal to have one condition or another, depending upon whether or not a block of lengthwise extending track is occupied by a vehicle, said means comprising:

A. a pair of arrival-detecting members, one located near each end of the block of track, each responsive to movement of a vehicle past its location to produce a momentary output;

B. a pair of departure-detecting members, each responsive to movement of a vehicle past its location to produce a momentary output, each of said departure-detecting members being located near an arrival-detecting member but being spaced along the track therefrom in the direction away from the other arrival-detecting number;

C. a memory relay having
   1. an energizable actuator,
   2. switch means electrically connected with the actuator, said switch means being normally open but being closed when the actuator is energized, and
   3. a control element connected with the signal to control the condition thereof, said control element having one position, corresponding to one condition of the signal, when the actuator is energized, and having another position, corresponding to another condition of the signal, when the actuator is unenergized;

D. first and second relay means, each having
   1. energizable actuator means, and
   2. contactor means movable between open and closed positions, biased to one of said positions, and movable to the other of said positions upon energization of the actuator means;

E. means defining a first memory relay energizing circuit connected with the actuator of the memory relay and comprising the contactor means of the first relay means, through which circuit the memory relay actuator can be momentarily energized when the switch means is open;

F. means defining a second memory relay energizing circuit connected with the switch means to be completed by closure thereof and through which the memory relay actuator can be maintained energized when said switch means is closed, said second memory relay energizing circuit comprising the contactor means of the second relay means, so connected as to provide for momentary deenergization of the memory relay actuator;

G. means connecting each of said arrival-detecting members with the actuator means of one of said relay means to provide for momentary change of position of the contactor means of said one relay means in response to a momentary output from an arrival-detecting member; and H. means connecting each of said departure-detecting members with the actuator means of the other relay means to provide for momentary change of position of the contactor means of said other relay means in response to a momentary output from a departure-detecting member.

2. Apparatus of the type comprising display means having alternative conditions which respectively indicate whether or not a vehicle occupies a lengthwise extending block of track along which vehicles may run in both directions, control means governing the condition of the display means, trackside detectors for producing momentary outputs to which the control means can respond, and exciter means carried by each vehicle using the track for cooperation with the detectors to cause the same to produce their outputs, said apparatus being characterized by:

A. the exciter means carried by each vehicle comprising an exciter located at each end of the vehicle, said exciters being spaced to opposite sides of the vehicle centerline so that the left and right orientation of the exciters with respect to the front and rear of the vehicle is the same irrespective of the direction in which the vehicle runs, and the exciters being located similarly on all vehicles using the track; and B. the detectors for the block of track comprising
   1. a pair of arrival detectors, each so connected with the control means that a momentary output from the arrival detector causes the display means to be placed in one of its conditions, said arrival detectors being located
      a. one near each end of the block of track and
      b. each at the side of the track at which it is adjacent to the exciter at the front of a vehicle moving into the block of track, and
   2. a pair of departure detectors, each so connected with the control means that a momentary output from the departure detector causes the display means to be placed in the other of its conditions, said departure detectors being located
      a. one near each of the arrival detectors but spaced therefrom along the track in the direction away from the other arrival detector, and
      b. each departure director being at the same side of the track as its adjacent arrival detector.

3. The apparatus of claim 2, further characterized by;
C. the control means comprising a memory unit having two alternative conditions which respectively correspond to said conditions of the display means and each of which the memory unit tends to maintain, said memory unit having two input elements and being convertible from one of its conditions to the other by a momentary input to one of said input elements and from its said other condition to its first mentioned condition by a momentary input to the other of said input elements;

D. means providing a connection between each arrival detector and one of said input elements of the memory unit; and E. means providing a connection between each departure director and the other of said input elements of the memory unit.

4. The apparatus of claim 3, further characterized by;
F. said memory unit comprising a memory relay having
   1. an energizable actuator,
   2. switch means electrically connected with the actuator, said switch means being normally open but being closed when the actuator is energized, and
   3. a control element connected with the display means to control the condition thereof and which has one condition when said actuator is energized and another condition when said actuator is unenergized; and G. said input elements respectively comprising a pair of relay means, each having
   1. energizable actuator means, and
   2. contactor means movable between open and closed positions, biased to one of said positions and movable to the other of said positions upon energization of the actuator means, one of said relay means having its contactor means normally open and connected in an energizing circuit with the actuator of the memory relay, and the other having its contactor means normally closed and connected in an energizing circuit with said switch means and the actuator of the memory relay to provide for momentary deenergization of the memory relay actuator.

* * * * *